V. O. MERVINE.
WHEEL.
APPLICATION FILED FEB. 19, 1910.

987,009.

Patented Mar. 14, 1911.
2 SHEETS—SHEET 1.

WITNESSES:

INVENTOR
VINCENT O. MERVINE,
BY Munn & Co
ATTORNEYS

V. O. MERVINE.
WHEEL.
APPLICATION FILED FEB. 19, 1910.
987,009.
Patented Mar. 14, 1911.
2 SHEETS—SHEET 2.
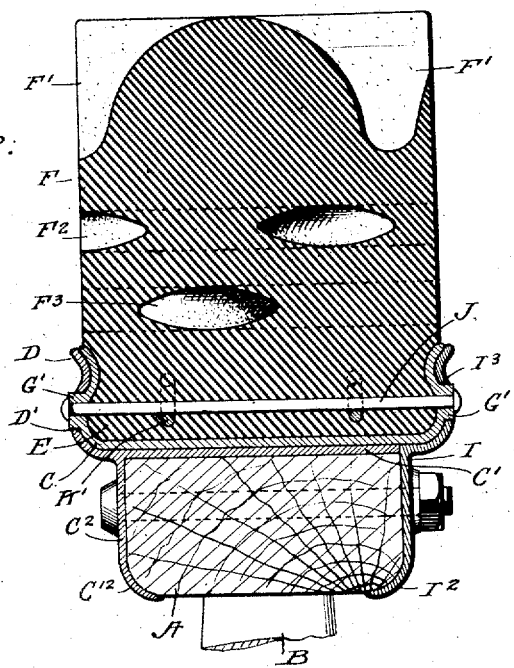
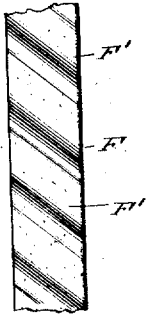
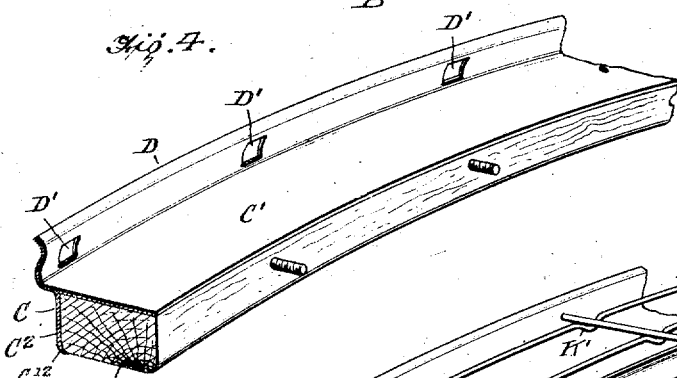
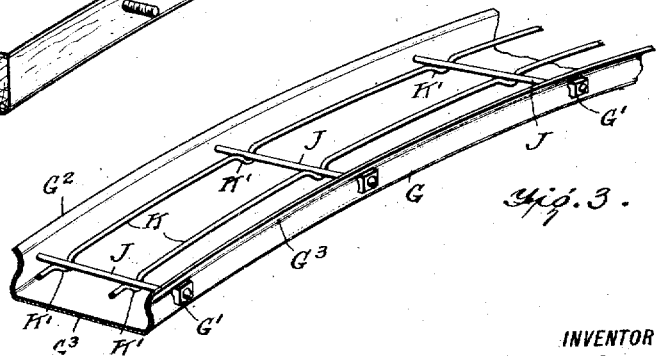
WITNESSES:
L. H. Schmidt
Percy B. Turpin
INVENTOR
VINCENT O. MERVINE
BY Munn & Co.
ATTORNEYS

UNITED STATES PATENT OFFICE.

VINCENT O. MERVINE, OF STROUDSBURG, PENNSYLVANIA.

WHEEL.

987,009.  Specification of Letters Patent.  Patented Mar. 14, 1911.

Application filed February 19, 1910.  Serial No. 544,928.

*To all whom it may concern:*

Be it known that I, VINCENT O. MERVINE, a citizen of the United States, and a resident of Stroudsburg, in the county of Monroe and State of Pennsylvania, have invented certain new and useful Improvements in Wheels, of which the following is a specification.

This invention is an improvement in wheels, and especially in wheels designed for use on automobiles and similar vehicles; and the invention consists in certain novel constuctions and combinations of parts as will be hereinafter described and claimed.

Figure 1:
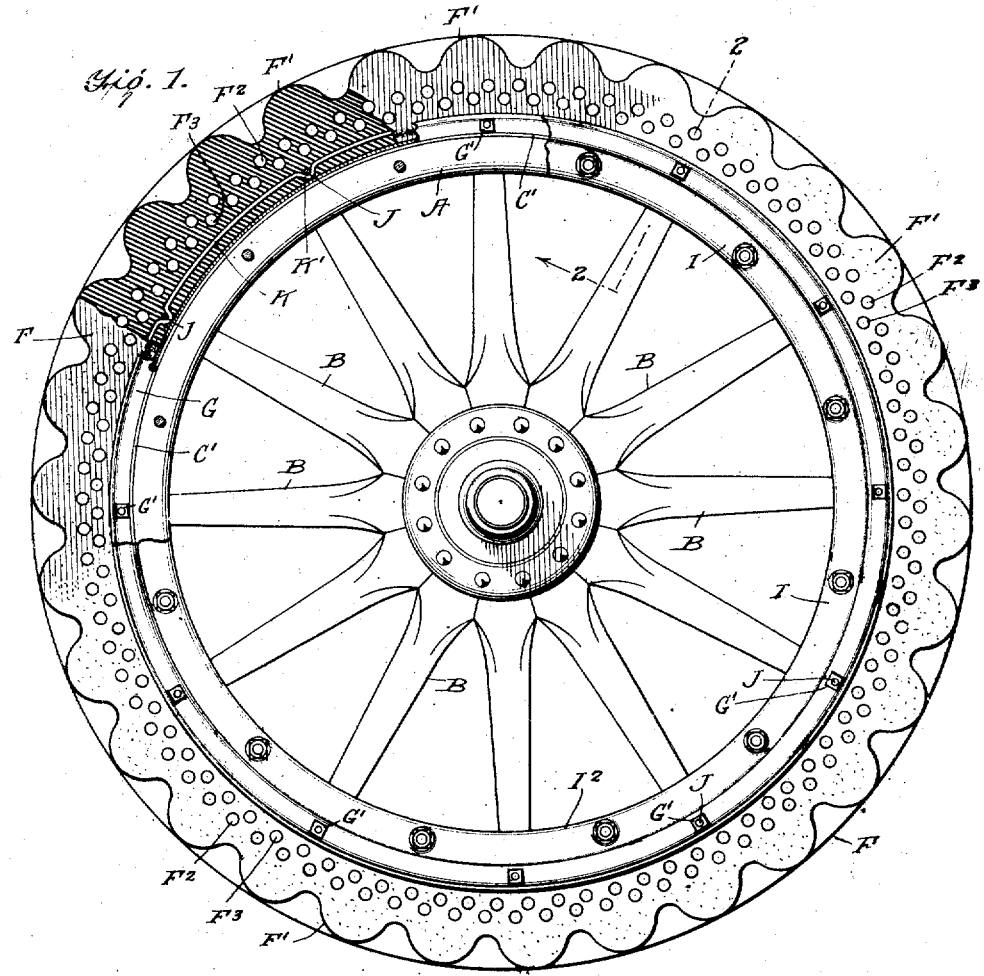
Figure 5:
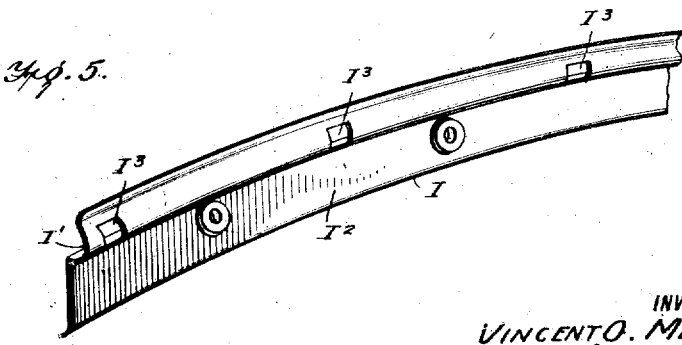

In the drawing Figure 1 is a side view of a wheel embodying my invention, parts being broken away and others being shown in section. Fig. 2 is a cross sectional view on about line 2—2 of Fig. 1. Fig. 3 is a detail perspective view of a portion of the tire carrier, parts being broken away. Fig. 4 is a detail perspective view of a portion of the rim plate having the fixed flange and the bolt flange. Fig. 5 is a detail perspective view of a portion of the removable flange, and Fig. 6 is a detail face view of a portion of the tire.

In the construction shown, the felly A of the wheel may be carried by the spokes B in the usual manner and to this felly is secured the rim plate C which rests upon the outer surface of the felly A and may be secured thereto in any suitable manner. This rim plate terminates at one edge C' at one side of the felly A and is provided at its other edge with an inwardly projecting bolt flange C² and with an outwardly projecting tire securing flange D, the latter being curved in cross section to embrace a flange E at the inner edge of the tire F and being also provided at intervals with openings D' for the reception of bosses or projections G' at the outer side of the tire carrier G presently described.

The bolt flange C² is provided at its inner edge with a lip C¹² which fits slightly within the felly A and this flange C² is perforated for the bolts H which extend through the flange C² thence through the felly A and project at their free ends beyond the opposite side of the felly to receive the removable flange I as shown in Fig. 2 of the drawing. The flange I has a bolt receiving plate I² similar to the flange C² of the rim plate and has its flange proper I' curved to fit the flange of the tire carrier and provided with openings I³ to receive the bosses G' on the tire carrier when the parts are applied as shown in Fig. 1 of the drawings.

The tire carrier G is provided at its edges with the flanges G² which are curved to engage the bead or flange E of the tire F and this tire carrier is provided between its flanges G² with means for holding the rubber tire when the latter is molded within the tire carrier in the use of the invention. As shown, this comprises cross rods J which extend through the bosses G' and are suitably secured by riveting as shown or otherwise as may be desired and these cross rods are spaced slightly away from the base plate G³ of the carrier G so the molded rubber may pass below the cross rods. To these cross rods are secured circumferentially disposed anchor rods K which are spaced away from the base plate G³ of the carrier usually to a greater extent than the cross rods J and are provided adjacent the said cross rods with inwardly dipping portions K' which curve below and are secured to the cross rods so that the cross rods brace, steady and anchor the circumferential rods in position. By this construction, when the tire as shown is molded in the carrier, it will be firmly held thereto as against strains in various directions such as are exerted ordinarily upon automobile wheels in the operation of such machines.

As shown, the tire F has its outer surface formed with diagonally disposed cross ribs F' and is also provided with a plurality of series of channels F² and F³ extending transversely through the tire and diagonally to the circumference thereof, the outer channels F² being disposed at approximately a right angle to the direction of the ribs F' and the channels F³ of the inner series extending at approximately a right angle to the channels F², this construction affording considerable elasticity in the use of the tire with the minimum weakening effect upon the tire.

By my invention, it will be noticed I provide a tire carrying plate having edge flanges to retain the tire and provided between said flanges and overlying its base plate with transverse and circumferential tire anchoring rods spaced from the base plate of the tire carrier, as more fully described above. I also provide means for detachably securing this tire carrier in place upon the wheel, said means having devices for interlocking with the tire carrier for preventing any movement thereof in a circular direction upon the wheel and the construction is so formed as to facilitate the application and removal of the tire carrier in the use of the invention.

I claim:

The combination of a felly, a rim plate secured thereon and having at one edge a fixed flange provided with openings and also having at said edge a bolt flange lapping alongside the felly, bolts extending through the bolt flange and felly and projecting beyond the opposite side of the felly, a tire carrier fitting on the rim plate and having edge flanges provided with bosses or projections, those on the flange of the carrier adjacent to the flange of the rim plate fitting the openings in said flange and a removable flange applied to the opposite side of the carrier and having a flange proper lapping alongside and receiving the bosses of the carrier and also having a bolt flange held by the bolts extended through the felly, all substantially as and for the purposes set forth.

VINCENT O. MERVINE.

Witnesses:
SOLON C. KEMON,
PERRY B. TURPIN.